Figure 1:
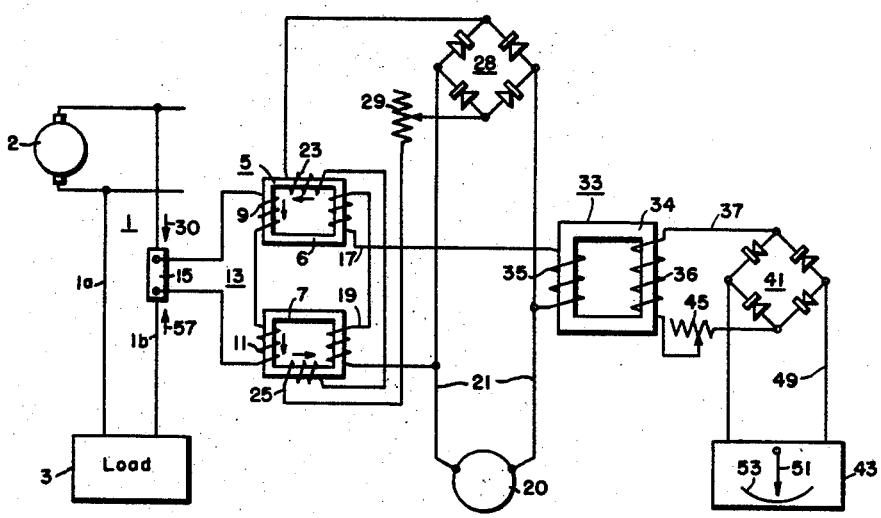

June 23, 1959   R. J. RADUS ET AL   2,892,155
APPARATUS RESPONSIVE TO DIRECT QUANTITIES
Filed Aug. 9, 1954

WITNESSES
Edwin E. Bassler
David M. Schiller

INVENTORS
Raymond J. Radus &
William G. Evans
BY
C. L. Freedman
ATTORNEY

United States Patent Office 2,892,155
Patented June 23, 1959

2,892,155
APPARATUS RESPONSIVE TO DIRECT QUANTITIES

Raymond J. Radus, Monroeville, and William G. Evans, Pittsburgh, Pa., assignors to Westinghouse Electric Corporation, East Pittsburgh, Pa., a corporation of Pennsylvania Application August 9, 1954, Serial No. 448,702

2 Claims. (Cl. 324—117)

This invention relates to apparatus responsive to direct quantities and has particular relation to apparatus including saturable magnetic core means responsive to direct currents flowing in direct-current circuits.

In the past, direct-current conversion units have been provided which include saturable magnetic core means. Control winding means link the core means to be energized in accordance with a direct quantity present in an associated direct-current circuit to effect magnetization of the core means in accordance with such direct quantity.

The conversion unit further includes impedance winding means which link the core means to have an impedance dependent upon the magnetic condition of the core means. The impedance winding means are connected for energization from a suitable source of alternating current to control the magnitude of the alternating output of the source. With such arrangement, the magnitude of the alternating output of the source is observed to be substantially linearly related to the magnitude of the energizing direct quantity over a substantial range of values of such direct quantity with the exception of relatively small and zero values thereof. For such values of the energizing quantity, the magnitude of the controlled alternating output deviates from the desired linearity to a certain extent such that for a zero value of the energizing quantity there exists a predetermined finite value of the controlled alternating output.

In accordance with the present invention, compensating means are provided for the purpose of substantially correcting the non-linear condition occurring within the range of relatively small values of the energizing quantity so that for a zero value of the energizing quantity there is produced an output quantity having a zero value. The compensating means preferably includes an electroresponsive device proportioned to exhibit a so-called "threshold effect" so as to produce an output quantity of zero value in response to energization levels below a predetermined "threshold energization level."

According to one embodiment of the invention, the compensating means is in the form of an electro-magnetic transformer device having a magnetic core and primary and secondary windings linking the magnetic core. The primary windings are connected for energization from the source of alternating current through the impedance windings of the core means to produce in the secondary windings an alternating output quantity. The transformer is constructed to exhibit a "threshold effect" so that the output quantity produced thereby has a zero value for a zero value of the energizing direct quantity. In a preferred embodiment of the invention, the alternating output quantity of the compensating transformer is applied to suitable rectifier means for producing a direct output quantity.

In accordance with a further embodiment of the invention, the transformer and rectifier means are proportioned so that the relationship between the magnitudes of the energizing direct quantity and the direct current produced by the rectifier means possesses a high degree of linearity over the entire operating range of the associated saturable core means.

The direct-current output of the rectifier means may be applied to suitable direct-current responsive utilization means. In a preferred embodiment of the invention, the direct-current output is applied to a direct-current measuring instrument for providing an indication of the magnitude of the direct quantity energizing the saturable core means.

Suitable bias windings are also provided to link the magnetic core means. The bias windings are effective when energized to render the core means responsive to the polarity of the energizing quantity to thereby render the measuring instrument responsive to both the magnitude and the direction of the energizing quantity.

It is, therefore, an object of the invention to provide apparatus including saturable magnetic core means responsive to direct quantities having improved transfer characteristics.

It is another object of the invention to provide apparatus including saturable magnetic core means effective when energized in accordance with a direct quantity for producing a direct output quantity having a magnitude linearly related to the magnitude of the energizing quantity over the entire range of energization of the saturable core means.

It is a further object of the invention to provide apparatus as defined in the preceding paragraph having an output circuit insulated from an input circuit.

It is still another object of the invention to provide apparatus as defined in the two preceding paragraphs which is responsive to the polarity of the direct quantity energizing the saturable core means.

It is still another object of the invention to provide saturable magnetic core means responsive to a direct quantity for producing an alternating quantity with compensating means including an electro-responsive device exhibiting a threshold effect responsive to the alternating quantity for producing an output quantity having a desired linear relationship with respect to the energizing direct quantity.

Figure 2:
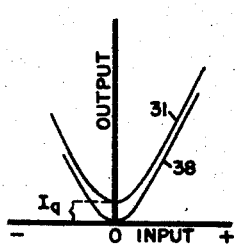
Figure 3:
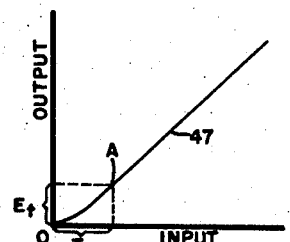
Figure 4:
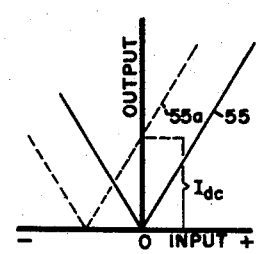

Other objects of the invention will be apparent from the following description, taken in conjunction with the accompanying drawings, in which:

Figure 1 is a schematic representation of an electrical system embodying the invention; and Figs. 2, 3 and 4 are graphical representations showing various relationships between certain of the electrical quantities present in the system of Fig. 1.

Referring to the drawings, there is illustrated in Fig. 1 a schematic representation of an electrical system incorporating the teachings of the present invention.

With reference to Fig. 1, there is shown a direct-current circuit which is represented generally by the numeral 1. For present purposes, it will be assumed that the circuit 1 comprises a pair of conductors 1a and 1b adapted to carry direct current between a source of direct current 2 and a suitable load device 3. It will be further assumed that direct current flows through the conductor 1b in either of two opposing directions.

A suitable conversion unit in the form of saturable magnetic core means 5 is associated with the circuit 1. The core means 5 is shown as comprising a pair of magnetic cores 6 and 7 which may be constructed of any suitable magnetic material. The cores 6 and 7 are proportioned to saturate within the range of energization of the core means 5.

In order to effect magnetization of the cores 6 and 7 in accordance with a direct quantity present in the direct-current circuit 1, suitable control windings 9 and 11 link respectively the magnetic cores 6 and 7. The control windings 9 and 11 are connected in series circuit relation and are included in a shunt circuit represented generally by the numeral 13. In a preferred embodiment of the invention, the control windings 9 and 11 are connected for energization in accordance with direct current flowing in the circuit 1, although the control windings may be connected for energization in accordance with direct voltage if desired.

To this end, a conventional shunt device 15 is connected in series circuit relation relative to the direct-current circuit 1. The shunt circuit 13 includes a pair of terminals which are connected to the shunt device 15 for shunt energization therefrom. The shunt device 15 is effective to divert a small direct current from the circuit 1 through the shunt circuit 13 for effecting energization of the control windings 9 and 11 in accordance with direct current flowing in the circuit 1.

Suitable impedance windings 17 and 19 link respectively the magnetic cores 6 and 7 with each of the windings 17 and 19 having an impedance dependent upon the magnetic condition of the associated cores 6 and 7. This may be explained by considering the fact that for relatively small values of direct current flowing in the shunt circuit 13, the magnetic cores 6 and 7 are magnetized to a slight degree whereby the impedance of the windings 17 and 19 is relatively large. If the magnitude of the direct current flowing in the shunt circuit 13 is increased, magnetization of the cores 6 and 7 is also increased whereby the impedance of the windings 17 and 19 is substantially reduced.

The saturable core means 5 in effect constitutes a variable impedance device and may conveniently be employed to control the magnitude of an alternating quantity. To this end, the impedance windings 17 and 19 are connected for energization from an alternating-current source 20 through conductors 21 to control the magnitude of the alternating-current delivered from the source 20 through the impedance windings 17 and 19.

Bias windings 23 and 25 are provided which link respectively the magnetic cores 6 and 7 for effecting when energized predetermined magnetization of the cores 6 and 7. The bias windings 23 and 25 are connected for series energization from a suitable source of direct current which conveniently may comprise a rectifier unit 28 connected for energization from the source of alternating current 20. The magnitude of direct current supplied by the unit 28 to the windings 23 and 25 may be controlled by means of a variable resistance 29 connected in series circuit relation with the windings 23 and 25.

It is observed with reference to Fig. 1 that for current flow through the conductor 1b in the direction indicated by the arrow 30 the polarities of the bias windings 23 and 25 are such as to effect cumulative magnetization of the cores 6 and 7 relative to the control windings 9 and 11, as is indicated by the small arrows associated with the windings 9, 11, 23 and 25. The purpose of the bias windings will be explained more fully hereinafter. For present purposes, it will be assumed that the bias windings 23 and 25 are in a deenergized condition and have no effect upon the magnetic condition of the cores 6 and 7.

Although for certain applications satisfactory operation of the core means 5 may be realized by employing core means 5 consisting only of those components represented by the numerals 6, 9 and 17, the performance of the core means 5 is improved if the additional components represented by the numerals 7, 11 and 19 are also employed. This may be explained by considering the fact that alternating current flowing from the source 20 through the impedance winding 17 is effective to establish an alternating magnetomotive force which directs magnetic flux through the core 6 which links the control winding 9. Such magnetic flux operates to induce an alternating voltage in the control winding 9 which directs alternating current through the shunt circuit 13. This alternating current may adversely affect the operation of the core means 5. By providing the additional components represented by the numerals 7, 11 and 19, such alternating current may be entirely eliminated.

To this end the impedance windings 17 and 19 are connected in series circuit relation with the polarities of the connections being such that alternating current flowing through the windings 17 and 19 induces alternating voltages in the windings 9 and 11 which act to direct alternating currents through the shunt circuit 13 in opposite directions. With such arrangement, the impedance windings 17 and 19 are connected to have substantially zero resultant coupling relative to the shunt circuit 13.

As mentioned hereinbefore, the magnitude of the alternating current flowing from the source 20 through the impedance windings 17 and 19 is substantially proportional to the magnitude of the direct current flowing through the direct-current circuit 1 over a substantial range of values of such direct current. However, for relatively small values and zero values of such direct current, it has been observed that the magnitude of the alternating current flowing through the windings 17 and 19 deviates to a certain extent from such proportionality.

With reference to Fig. 2, there is illustrated a graphical representation showing the relationship between the magnitude of alternating current traversing the windings 17 and 19 and the magnitude of direct current flowing in the direct-current circuit 1. In Fig. 2, the ordinate represents the output alternating current whereas the abscissae represent the input direct current. Such relationship is represented by a curve 31 which is observed to be linear with the exception of a portion thereof corresponding to relatively small and zero values of direct current in the circuit 1. For such values, the curve 31 deviates to a certain extent from linearity such that for a zero value of direct current in the circuit 1 a predetermined finite value of alternating current flows through the windings 17 and 19. This finite alternating current is represented by the term $Iq$ as indicated in Fig. 2. The magnitude of the current $Iq$ depends to a large extent upon the characteristics of the core means 5 and upon the magnitude of the voltage of the source 20.

In accordance with the present invention, compensating means are associated with the core means 5 for substantially correcting such deviation to provide an output quantity having a magnitude substantially linearly related to the magnitude of direct current in the circuit 1 over a wide range of values of such direct current including zero values thereof. According to the invention, the compensating means includes an electroresponsive device constructed to exhibit what is referred to as a "threshold effect" to have a predetermined "threshold energization level."

As utilized herein, the term "threshold effect" refers to the inability of certain electroresponsive devices to produce an electrical output quantity of appreciable value so long as the energization level of such a device is below a predetermined finite energization level. Such finite energization level is referred to as the "threshold energization level" of such device.

A number of electroresponsive devices which exhibit such a threshold effect are presently available. For example, a barrier layer rectifier, such as a selenium rectifier, will not conduct appreciably in the forward direction until a predetermined minimum value of voltage is impressed on such a rectifier in the forward direction. As a further example, a gas tube, such as a cold-cathode gas diode, does not have appreciable anode current so long as the anode-cathode potential is less than the ionization potential of the gas.

According to one embodiment of the invention, the compensating means includes an electromagnetic transformer device 33 constructed to exhibit a threshold effect. The transformer 33 includes a magnetic core 34 with a primary winding 35 and a secondary winding 36 linking the core 34. As illustrated in Fig. 1, the primary winding 35 is connected for energization from the source 20 through the impedance windings 17 and 19 of the core means 5. The primary winding 35 is effective when so energized to produce a magnetomotive force for directing magnetic flux through the magnetic core 34 which links the secondary winding 36. By reason of the alternating nature of the magnetic flux a voltage is induced in the secondary winding 36 which causes an alternating output current to flow through a secondary output circuit 37.

The transformer 33 is constructed in accordance with the invention to exhibit a threshold effect so as to produce a substantially zero alternating output in the circuit 37 for energization of the transformer in accordance with the alternating current $Iq$ which is present when zero direct current flows in the circuit 1. To this end the core 34 of the transformer is constructed of a material having substantially rectangular magnetic hysteresis loop characteristics. A number of materials exhibiting such characteristics are presently available. In a preferred embodiment of the invention, the core 34 is constructed of a presently available nickel-iron alloy containing approximately equal parts by weight of nickel and iron. The transformer 33 is constructed and the number of turns of the winding 35 is selected so that the winding 35 produces when energized in accordance with the current $Iq$ a magnetomotive force substantially equal to the magnetomotive force required to supply loss and magnetizing components of magnetic flux for the core 34.

With reference to Fig. 2 there is illustrated a graphical representation showing the relationship between the magnitude of alternating current flowing in the output circuit 37 of the transformer 33 and the magnitude of direct current flowing in the circuit 1. As previously mentioned, the ordinate represents the output alternating current and the abscissae represent the input direct current. This relationship is represented by the curve 38 which is observed to have a zero origin, and which is observed to be linear with the exception of a portion thereof corresponding to relatively small values of current in the circuit 1. This non-linearity of the curve 38 is dependent to a large extent upon the transfer characteristics of the transformer 33, and may be acceptable for certain applications.

If desired, the alternating output of the transformer 33 may be applied directly to suitable utilization means. In a preferred embodiment of the invention the output of the transformer 33 is applied to suitable rectifier means 41 for producing a direct quantity which is applied to direct current responsive utilization means 43 as will appear hereinafter.

As is understood in the art, saturable magnetic core means, such as the core means 5, exhibit substantially constant current characteristics. This means that the magnitude of the alternating current traversing the windings 17 and 19 for a certain energization of the windings 9 and 11 is substantially constant over a substantial range of resistance values of an associated load device to which such alternating current is supplied. However, for increasingly large values of resistance of the associated load device, the magnitude of such alternating current will deviate by an increasing amount from such constant value. By applying such alternating current to the utilization means 43 through the transformer 33 it has been observed that the magnitude of the alternating output of the transformer 33 remains substantially constant for a certain energization of the windings 9 and 11 over a range of resistance values of the utilization means 43 which is considerably greater than the range for which alternating current traversing the windings 17 and 19 would remain constant if the transformer 33 were omitted.

Although the operation of the apparatus employing only the core means 5 and the compensating transformer 33 is satisfactory for many purposes, the operation may be improved considerably by providing additional compensating means. Such additional compensating means may comprise any suitable device which exhibits a threshold effect.

In accordance with a further embodiment of the invention the additional compensating means comprises a rectifier device, such as the device 41, which exhibits a threshold effect. As mentioned hereinbefore, a barrier layer rectifier does not conduct appreciably in the forward direction until a predetermined minimum value of voltage is applied to the rectifier in the forward direction. In a preferred embodiment of the invention the rectifier device 41 is of the barrier layer type, such as a selenium rectifier, and is of conventional bridge form for effecting full wave rectification. A suitable filter network (not shown) is preferably associated with the rectifier 41 to eliminate the ripple component of the rectifier output voltage.

As illustrated in Fig. 1, the rectifier 41 is connected in the output circuit 37 for energization from the transformer 33. By proper selection of the transformer 33 and the rectifier 41, the magnitude of the output quantity of the rectifier 41 may be caused to have a linear relationship relative to the magnitude of direct current in the circuit 1 over the entire range of energization of the core means 5 including zero values of the current in the circuit 1.

With reference to Fig. 3, there is illustrated a graphical representation showing the relationship between the magnitudes of the alternating current applied to the winding 35 of the transformer 33 and the alternating voltage appearing across the winding 36 of the transformer 33. In Fig. 3 the ordinate represents the output voltage across the winding 36 and the abscissa represents the input current to the winding 35. According to the embodiment of the invention presently under discussion, the transformer 33 is constructed so that such relationship is represented by a curve 47 which is observed to be linear with the exception of a portion thereof corresponding to low values of the current applied to the winding 35. The core 34 of the transformer 33 may be constructed of the material previously described employed in the transformer of the previously described embodiment, and the windings 35 may be proportioned to provide the desired transfer characteristics as represented by the curve 47.

The transformer 33 and the rectifier 41 are constructed so that for energization of the winding 35 by the current $Iq$ there is produced across the winding 36 a voltage having a magnitude which is just slightly less than the magnitude of the threshold voltage of the rectifier 41, and which is defined by a point of the curve 47 located on the linear portion of the curve 47. This condition is illustrated in Fig. 3 wherein the point A on the linear portion of the curve 47 corresponds to a current $Iq$ applied to the winding 35, and to a voltage $Et$ appearing across the winding 36 which has a magnitude slightly less than the magnitude of the threshold voltage of the rectifier 41. Consequently, the point A also corresponds to a zero value of current in the circuit 1 and to a zero value of the output quantity of the rectifier 41.

With such arrangement the range of operation of the transformer 33 is confined to the linear portion of the curve 47 for the entire range of energization of the core means 5. Consequently, variations in the magnitude of the current in the circuit 1 will effect proportionate changes in the value of the output quantity of the rectifier 41. An adjustable resistance 45 is included in the circuit 37 in series relation with the winding 36 to permit adjustment of the magnitude of the voltage applied to the rectifier 41 from the winding 36 of the transformer 33. This arrangement affords compensation for variations in the properties of the transformer 33 and the rectifier 41.

The invention is particularly applicable to the measurement of variable direct currents flowing in direct current circuits having relatively large voltages. Consequently, the utilization means 43 may comprise a direct current responsive measuring instrument which may be in the form of either an indicating or recording instrument. In the embodiment of Fig. 1, the utilization means 43 is in the form of an indicating instrument including an indicating pointer 51 cooperating with a suitable scale 53. By reason of the linear relationship between the magnitudes of the direct currents in the circuits 1 and 49 the scale 53 may be linear over the entire range thereof. Because of the core means 5 and the transformer 33 the utilization means 43 is completely insulated from the direct current circuit 1. Provision of the transformer 33 and the rectifier 41 permits the measurement of relatively small values of direct current with a high degree of accuracy.

It will be recalled that the core means 5 includes bias windings 23 and 25 effective when energized to provide premagnetization of the cores 6 and 7. As will presently appear, the bias windings are effective to render the core means 5 responsive to the polarity of direct current flowing in the circuit 1. For purposes of illustration, the linear relationship between the magnitudes of the direct currents in the circuits 1 and 49 is represented in Fig. 4 by a curve 55. In Fig. 4 the ordinate represents the output current in the circuit 49 and the abscissae represent the input current in the circuit 1. The curve 55 has a zero origin defined by the point of intersection of the ordinate and abscissae of Fig. 4 to indicate an unbiased condition of the core means 5.

Let is be assumed that current flows through the circuit 1 in the direction indicated by the arrow 30, and that the bias windings 23 and 25 are connected for energization from the source 28 with polarity to effect cumulative magnetization of the cores 6 and 7 relative to the control windings 9 and 11 as indicated by the arrows adjacent the windings 9, 11, 23 and 25. With such arrangement the relationship between the magnitudes of the direct currents in the circuits 1 and 49 may be represented by the dotted curve 55a of Fig. 4. It is observed that by reason of the cumulative effects of the bias windings 23 and 25 the curve 55a is shifted to the left from the unbiased position represented by the full line curve 55. The amount of shift is dependent upon the degree of premagnetization of the cores 6 and 7 produced by energization of the bias windings.

With reference to the curve 55a it is observed that for a zero value of direct current flowing in the circuit 1 there is present in the circuit 49 a predetermined value of direct current greater than zero by reason of the magnetization of the cores 6 and 7 produced by energization of the bias windings. This value of direct current is represented in Fig. 4 by the term I$dc$. If current is caused to flow in the circuit 1 in the direction of the arrow 30, then magnetization of the cores 6 and 7 is increased by reason of the cumulative effects of the windings 9, 11, 23 and 25, with the result that the direct current in the circuit 49 is also increased to a value somewhat larger than the value I$dc$. However, if current is caused to flow in the circuit 1 in the direction represented by the arrow 57, then the direct current in the circuit 49 is reduced to a value somewhat less than the value I$dc$ by reason of the differential effects of the bias windings.

Consequently, by providing a scale 53 having a zero center marking corresponding to direct current in the circcuit 49 having a value I$dc$, the device 43 may be caused to produce a response which is representative of the magnitude of direct current flowing in the circuit 1, and which is indicative of the polarity of such direct current.

Although the invention has been described with reference to certain specific embodiments thereof, numerous embodiments thereof are possible, and it is desired to cover all embodiments falling within the spirit and scope of the invention.

We claim as our invention:

1. In an electrical system, a direct current circuit, saturable magnetic core means, control winding means linking said core means, means connecting said control winding means for energization from said circuit to effect magnetization of said core means in accordance with a direct quantity present in said circuit, impedance winding means linking said core means having an impedance dependent upon the magnetic condition of said core means, a source of alternating current for producing a first alternating output, said impedance winding means being connected for energization from said source to control the magnitude of said first alternating output, said first alternating output having a magnitude which deviates from a desired linear relationship relative to the magnitude of said direct quantity such that for a zero value of said direct quantity said first alternating output has a predetermined finite value, compensating means for substantially correcting such deviation, said compensating means including transformer means having other magnetic core means constructed to exhibit substantially rectangular magnetic hysteresis loop characteristics, first winding means linking said other core means connected for energization from said source through said impedance winding means, and second winding means linking said other core means for producing a second alternating output in response to energization of said first winding means, said transformer means being constructed such that when said first winding means is energized in accordance with said finite value of said first alternating output a magnetomotive force is produced which is substantially equal to the magnetomotive force required to supply loss and magnetizing components of magnetic flux for said other core means whereby said second alternating output is substantially zero and said finite value of said first alternating output is compensated for, rectifier means connected for energization in accordance with said second alternating output to produce a rectifier output quantity, and translating means connected for energization in accordance with said rectifier output quantity to produce a response which is a function of said direct quantity.

2. In a device responsive to direct quantities present in a direct current circuit, a conversion unit including saturable magnetic core means, control winding means linking said core means to be connected for energization in accordance with a direct quantity present in said circuit to control the magnetic condition of said core means in accordance with said direct quantity, and impedance winding means linking said core means to have an impedance dependent upon the magnetic condition of said core means; said impedance winding means being arranged for energization from a source of alternating current to control the magnitude of the portion of the alternating output of said source traversing the impedance winding means, said conversion unit providing when energized a controlled alternating output having a magnitude which deviates from a desired linear relation with respect to the value of said direct quantity such that for a zero value of the direct quantity there is provided a finite value of the controlled alternating output, and compensating means for substantially correcting such deviation comprising an electromagnetic transformer device, said transformer device including magnetic core means constructed to exhibit substantially rectangular hysteresis loop characteristics, primary winding means linking said core means to be connected for energization in accordance with said output quantity, and secondary winding means linking said core means to produce an alternating output quantity in response to energization of said primary winding means; said transformer device being constructed such that when said primary winding means is energized in accordance with said finite value of said output quantity a magnetomotive force is produced which is substantially equal to the magnetomotive force required to supply loss and magnetizing components of magnetic flux for said core means whereby said alternating output quantity is substantially zero and said finite value of said controlled alternating output is compensated for.

References Cited in the file of this patent

UNITED STATES PATENTS

| | | |
|---|---|---|
| 2,149,092 | Kettler | Feb. 28, 1939 |
| 2,153,378 | Krämer | Apr. 4, 1939 |
| 2,157,006 | Oesinghaus | May 2, 1939 |
| 2,272,772 | Hathaway | Feb. 10, 1942 |
| 2,338,423 | Geyger | Jan. 4, 1944 |
| 2,548,176 | Semms et al. | Apr. 10, 1951 |
| 2,644,135 | Schnoll | June 30, 1953 |
| 2,779,911 | Fischer | Jan. 29, 1957 |

OTHER REFERENCES

Publication I: "Electrical Manufacturing," March 1954, page 138. (In Div. 69, Class 324–117.)

Article by Sven-Eric Hedstroem and Lennart F. Borg, published in "Electronics," September 1948, pages 88–93. Copies available in Scientific Library and 179–171 MA.